(12) United States Patent
Johnson

(10) Patent No.: US 9,298,756 B1
(45) Date of Patent: Mar. 29, 2016

(54) READ/WRITE RFID SYSTEM FOR ANIMALS

(71) Applicant: Mark Johnson, Spring Hill, TN (US)

(72) Inventor: Mark Johnson, Spring Hill, TN (US)

( * ) Notice: Subject to any disclaimer, the term of this patent is extended or adjusted under 35 U.S.C. 154(b) by 98 days.

(21) Appl. No.: 13/775,396

(22) Filed: Feb. 25, 2013

(51) Int. Cl.
  *H04Q 5/22* (2006.01)
  *G06F 17/30* (2006.01)
  *A01K 11/00* (2006.01)

(52) U.S. Cl.
  CPC ........ *G06F 17/30312* (2013.01); *A01K 11/006* (2013.01)

(58) Field of Classification Search
  CPC ............ B01J 19/00567; B01J 19/0046; B01J 2219/005; B01J 2219/0059; B01J 2219/00596; B01J 2219/00722; B01J 2219/00592; B01J 2219/00725; B01J 2219/00702; C40B 70/00; C40B 40/06; C40B 40/10
  USPC .......... 340/10.32, 10.33, 10.42, 10.51, 10.52, 340/572.1–572.9, 568.1, 539.1, 7.61–7.63
  See application file for complete search history.

(56) References Cited

U.S. PATENT DOCUMENTS

| | | | |
|---|---|---|---|
| 4,262,632 A | 4/1981 | Hanton et al. | |
| 4,333,072 A | 6/1982 | Beigel | |
| 4,730,188 A | 3/1988 | Milheiser | |
| 5,929,779 A | 7/1999 | MacLellan et al. | |
| 5,945,920 A | 8/1999 | Maletsky | |
| 6,012,415 A * | 1/2000 | Linseth | 119/174 |
| 6,051,377 A * | 4/2000 | Mandecki | 435/6.19 |
| 6,166,643 A | 12/2000 | Janning et al. | |
| 7,093,137 B1 * | 8/2006 | Sato et al. | 713/193 |
| 7,230,539 B2 | 6/2007 | Klein | |
| 7,240,833 B2 | 7/2007 | Zarembo | |
| 7,292,828 B1 * | 11/2007 | Liu et al. | 455/91 |
| 2001/0048360 A1 * | 12/2001 | Ishii et al. | 340/10.2 |
| 2005/0061890 A1 | 3/2005 | Hinckley | |
| 2005/0217607 A1 * | 10/2005 | Light et al. | 119/721 |
| 2006/0212096 A1 | 9/2006 | Stevenson | |
| 2006/0260557 A1 * | 11/2006 | McCabe et al. | 119/174 |
| 2007/0046476 A1 | 3/2007 | Hinkamp | |
| 2008/0097487 A1 | 4/2008 | Pool et al. | |
| 2008/0097496 A1 | 4/2008 | Chang et al. | |
| 2010/0328049 A1 * | 12/2010 | Frysz et al. | 340/10.51 |
| 2011/0297090 A1 * | 12/2011 | Chamberlain et al. | 119/51.02 |
| 2014/0180709 A1 * | 6/2014 | Chin | 705/2 |

OTHER PUBLICATIONS

"EquipassID Records Management System" Brochure, published Dec. 2011.
Bowker, David: "Animal Record Management Using an Embedded RFID-Based System" presented Nov. 2010 and published Jan. 2011.

* cited by examiner

*Primary Examiner* — Daniel Previl
(74) *Attorney, Agent, or Firm* — Patterson Intellectual Property Law, P.C.; Ryan D. Levy

(57) ABSTRACT

A method for maintaining identification and records relating to animals comprising the steps of obtaining information about an animal electronically and using RFID technology with a read/write functionality for storage of information; and implanting a RFID microchip implant having the read/write functionality within the animal which may be utilized for animals such as equine.

5 Claims, 6 Drawing Sheets

| Block | Function | Access |
|---|---|---|
| 00h | Serial number | R/O |
| 01h | Configuration word | Read/Write |
| 02h – 3Fh | User data | R/W |

Fig. 4

| | | |
|---|---|---|
| BLOCK 0 | 0x00 | |
| | 0x01 | |
| | 0x02 | |
| | 0x03 | |
| BLOCK 1 | 0x04 | First Name |
| | 0x05 | |
| | 0x06 | |
| | 0x07 | |
| BLOCK 2 | 0x08 | Last Name |
| | 0x09 | |
| | 0x0A | |
| | 0x0B | |
| BLOCK 3 | 0x0C | Address 1 |
| | 0x0D | |
| | 0x0E | |
| | 0x0F | |
| BLOCK 4 | 0x10 | Address 2 |
| | 0x11 | |
| | 0x12 | |
| | 0x13 | |
| BLOCK 5 | 0x14 | City |
| | 0x15 | |
| | 0x16 | |
| | 0x17 | |
| BLOCK 6 | 0x18 | Zip |
| | 0x19 | |
| | 0x1A | State Country |
| | 0x1B | Title |
| BLOCK 7 | 0x1C | USEF Registration # |
| | 0x1D | |
| | 0x1E | |
| | 0x1F | |
| BLOCK 8 | 0x20 | Breed/Discipline Amateur/Pro Member Status |

Fig. 5

READ/WRITE RFID SYSTEM FOR ANIMALS

BACKGROUND OF THE INVENTION

The present invention relates to systems, apparatuses, and methods for the identification and record management as well as essential and non-essential information relating to animals, the animals being optionally but not exclusively non-companion animals. In optional embodiments of the invention, RFID technology provides a method for recording and retrieving information about animals which may be particularly useful for the monitoring and evaluation of livestock. The invention may include security features and methods as well.

Radio-frequency identification (RFID) is generally understood to be the use of a device including microchips which may be incorporated into or applied to a product for the purpose of identification and tracking through the use of radio wave technology. Some types of RFID tags can be read from several feet away whereas others can be read from beyond the line of sight of an individual so long as certain reading equipment is available.

Generally, the majority of RFID devices include at least an integrated circuit for storing and processing information which may also be utilized for controlling a radio frequency signal with an additional part typically comprising an antenna for receiving and/or transmitting a signal. Currently, RFID devices include active RFID devices which may include a battery or alternatively passive RFID devices which usually require an external source to make the passive RFID device emit a signal.

One manner in which RFID technology has been utilized is for identification of animals. Most often the RFID devices, which may also be called RFID microchips, utilize passive RFID technology and can be implantable within the animal. Generally an RFID microchip utilized for companion and non-human consumption livestock, and other exotic animals, may include an integrated circuit that is optionally encased within a glass tube that is placed under the skin of an animal and uses passive RFID technology. Alternatively, exterior attached RFID devices may include ear tags as opposed to implants which may be used in identifying farm and ranch type animals produced for human consumption. Such tags are not as aesthetically acceptable.

In some use, low frequency RFID systems may be used which may operate at a frequency of about 134.2 kHz. In some countries such as Australia, such frequency is the standard for electronic identification of animals and so that conforming electronics can be created. For example, the Texas Instruments® RFID system has been used in such country as a passive system, thus requiring no internal batteries. This may result in an extended life as there is no concern about a battery's energy reserve being depleted.

Another use of RFID microchips is in tracking and returning companion animals. Additionally, such RFID microchips may be of use if there is a loss of a pet or dispute of ownership over animals as the chip may contain numerical information which may be used to access a data base and match an animal to the owner. Currently, the use of RFID microchips is becoming increasingly standard at shelters and veterinary clinics for lessening the loss of pets. Animal tracking appears to have been one of the first applications for certain RFID technology. In addition to livestock and companion animals, RFID technology has been used with animals for wildlife conservation purposes. For wildlife, the use of RFID technology may assist with monitoring migration patterns or assist in determining a change in population or breeding characteristics. Such technology has proven to be extremely cost effective, especially when compared to the Global Positioning System technology that has also been deployed. Especially with RFID ear tags, one can in a cost effective manner, monitor the movement or population shift of various forms of wildlife in a cheap yet effective manner.

The RFID microchips often utilized within animals are passive devices that do not act until a scanner or reader is in close proximity. Most companion and recreational animal RFID microchips include a microchip, an antenna coil and a capacitor all typically contained within a glass tube or vial. The microchip may contain the identification number and circuitry necessary for relaying that information to a scanner. The coil functions as a radio antenna for receiving electrical power from a scanner whereas the capacitor works in forming the circuit. The glass material may include a soda lime and may be hermetically sealed so as to preclude any influx of moisture or fluid into the unit.

Concerns for both the individual horse and the industry in general have necessitated the need for improved manners of identifying animals. Prior art identification methods which may include a lip tattoo or brand are antiquated, ineffective, and fail to meet the needs of the industry in the event of an outbreak of infectious disease. While RFID technology has been used for animals, these RFID devices have been read only and fail to employ the full measure of what RFID technology can accomplish. This along with cost/benefit concerns have swayed many horse owners from participating in current voluntary programs. Many horse owners fail to recognize a need to expend money on registration and veterinary services simply to register their animal in the database in the unlikely event that their horse is diseased, comes in contact with an infectious host or is lost or stolen. What is needed, therefore, is a method and/or system of electronic animal identification using a read/write RFID technology so as to provide multiple levels of genuine benefit to owners, veterinarians, state and federal officials, competition and event coordinators and other animals enthusiasts.

SUMMARY OF THE INVENTION

The present invention relates generally to an embedded RFID-based system for animals. In optional embodiments, the system may relate to an embedded RFID system for equine which may further include the use of a read/write injectable chip.

In additional optional embodiments, the invention may relate generally to a web-based system and method for facilitating the reading, updated, and alteration of individual equine records. More particularly, this invention may optionally relate to hardware and software for using RFID devices which may include interactive software or a website and associated methods of recording conditions and updating statuses for various horses, especially related to veterinary records and health data.

Owners or veterinarians currently access medical records and health information in the form of papers, files and charts that may be quite difficult to process and utilize at the particular point of need. Therefore, what is needed is to use an embedded RFID-system to allow for the maintenance, including updating as well as deletion of pertinent health information for animals, including equine.

An optional aspect of the present invention is to provide a system for recording and retrieving individual animal records electronically utilizing RFID technology.

Another optional aspect of the invention is to provide a system using read/write RFID technology for the equine industry.

Yet another optional aspect of the invention is a system utilizing RFID technology which includes read/write technology for animals on a game preserve.

Yet a further aspect of the invention is an RFID system with read/write technology which may be used with companion animals for recording and retrieving information.

Still a further aspect of the invention is a system including a network of data transfer storage and retrieval which utilizes injectable or subcutaneous RFID devices with information written to and stored on the RFID transponder.

In accordance with the purpose of the invention, as embodied and broadly described herein, the invention in optional embodiments may include a system for recording and retrieving information from animals having an injectable or subcutaneous RFID device. The system may be used with equine but in further optional embodiments may be utilized for other livestock, game animals, exotic animals non domesticated animals as well as companion animals.

The system in further optional embodiments may include a network of data transfer storage and retrieval wherein information is electronically written to and stored on an RFID device which may be injected or implanted subcutaneously within an animal. As used herein the term "subcutaneous" means any implantation of an RFID device or the like within an animal. Such description and use of the word "subcutaneous" does not require the chip to be implanted at a certain depth within the animal's body.

The accompanying drawings are incorporated in and constitute a part of this specification. The drawings illustrate optional embodiments of the invention and together with the description serve to explain some principles of the invention.

BRIEF DESCRIPTION OF THE DRAWINGS

FIG. 4 is an illustration of an optional data arrangement for an implantable Read/Write RFID chip.

FIG. 5 is an illustration of an optional overview of an implantable Read/Write RFID chip's memory.

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION

Figure 1:
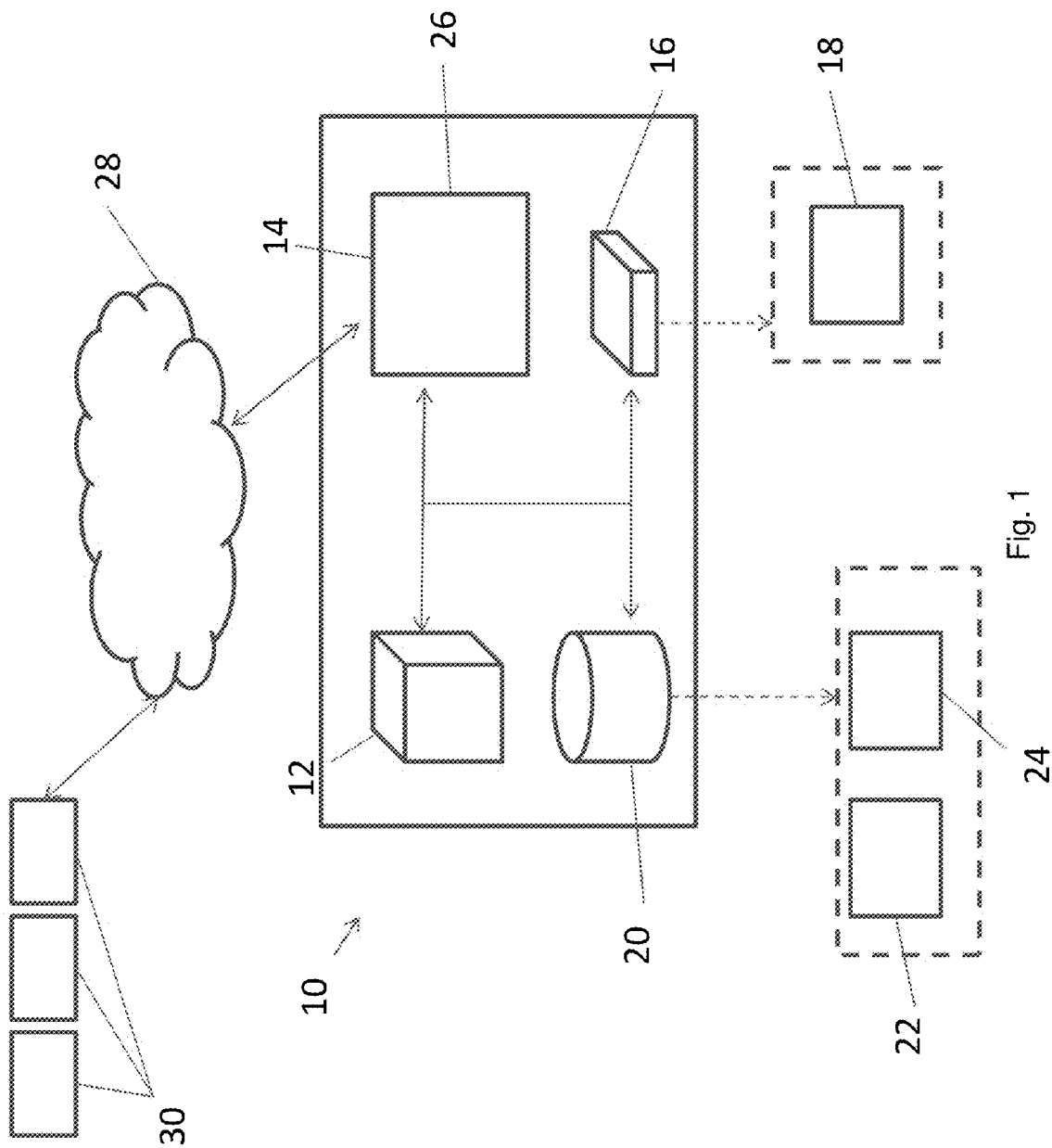
FIG. 1 is a block diagram representing an optional embodiment of a host system used in accordance with the Read/Write RFID system of the present invention.
Figure 2:
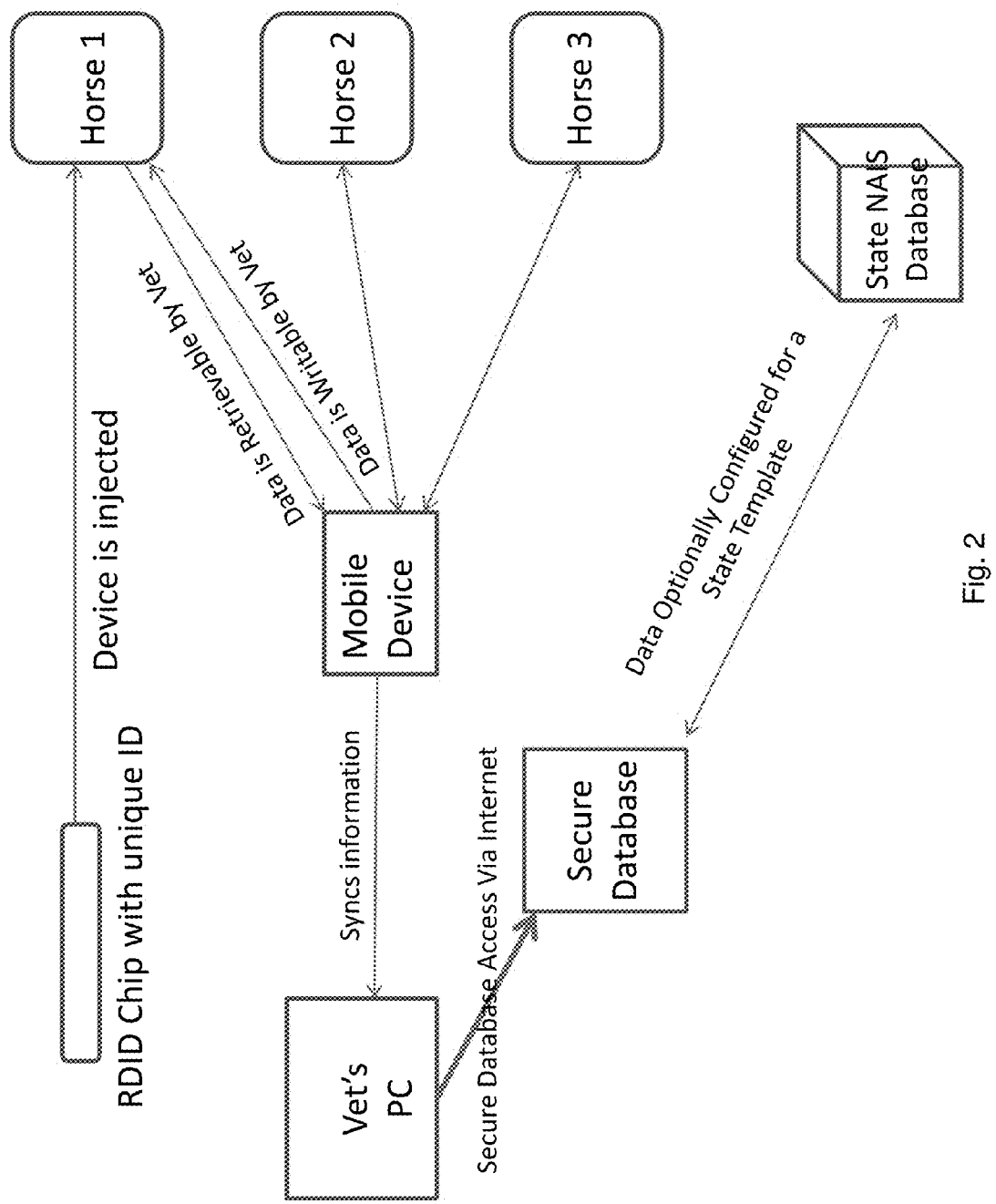
FIG. 2 is an illustration of an optional embodiment of a system of the present invention.
Figure 3:
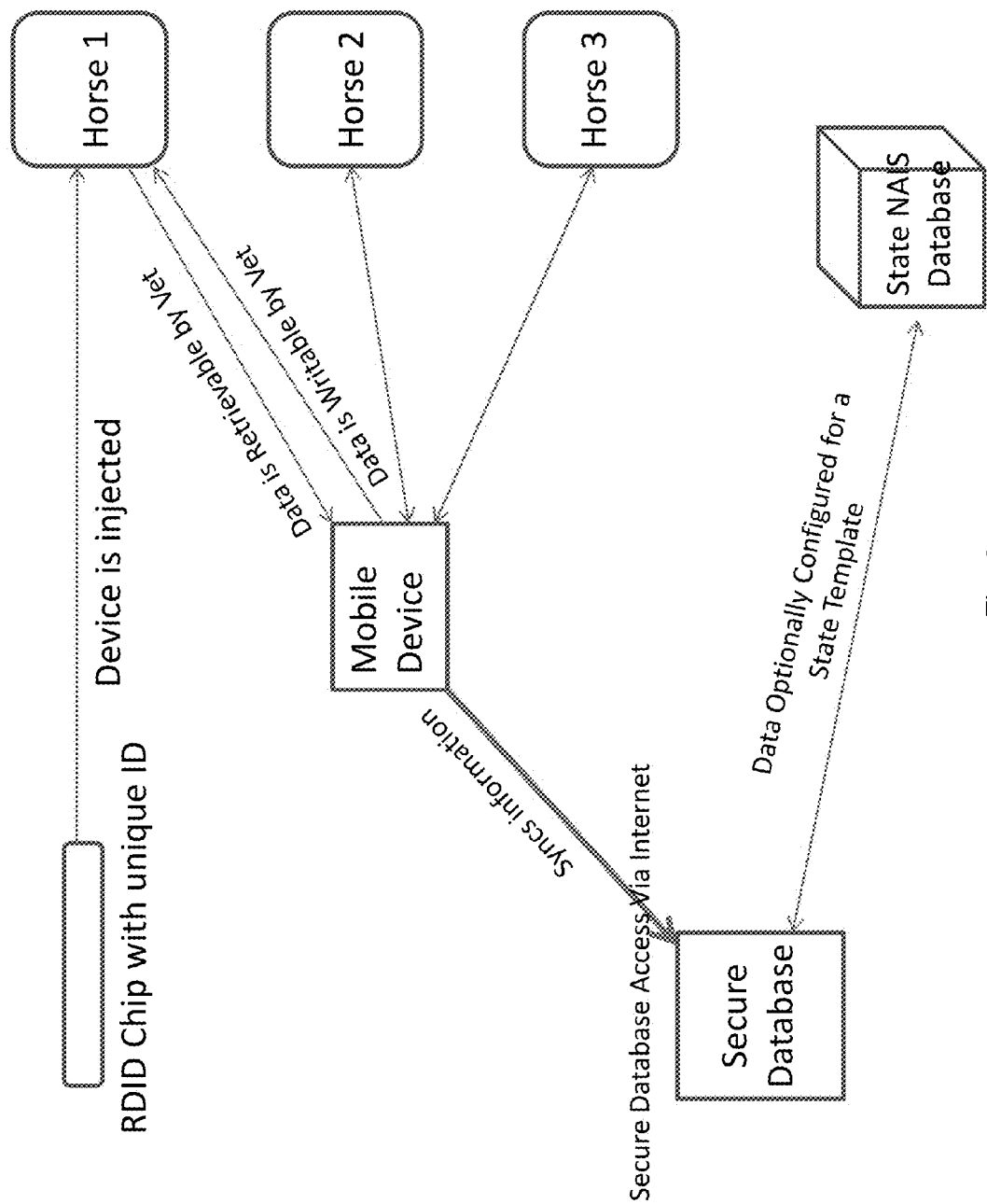
FIG. 3 is an illustration of a further optional embodiment of a system of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Also, as used herein, "vet" or "veterinarian" may refer to an individual in the medical profession for animals. For purposes of this application, "vet" may also refer to an authorized individual to use and have access to specific portions of the system.

Referring generally to FIGS. 1-6, systems, devices and methods in accordance with the present invention are provided herein for facilitating the implementation of a Radio Frequency Identification System (RFID) that may optionally use an embedded microchip in conjunction with a reader device for the purpose of storing and retrieving information. Where the various figures may describe embodiments sharing various common elements and features with other embodiments, similar elements and features are given the same reference numerals and redundant description thereof may be omitted below.

The system may utilize RFID technology which includes read/write functionality with the RFID microchip implantable within animals also being termed a passive RFID device. In further optional embodiments, the read/write RFID information which may be stored on the RFID implantable device may be linked to or connected with a complete data bank repository which may optionally include both essential and non-essential health data, individual management and government regulatory information, owner information, primary veterinary information and breed/discipline association data as well as combinations thereof. Generally further classes and types of information may be utilized depending upon the type of animal, the use of the animal as well as pertinent diseases, vaccinations and conditions that may be different in the various types of animals as well as breeds of animals.

As used herein, the term "inject" means to insert into, place into, cover with tissue, or input within.

The invention generally relates to bringing the functionality of storing and retrieving information directly into the implantable microchip, which can be updated whenever necessary. In addition, the larger memory capability of the chips of the present invention allow for the storage of important medical information directly onto the RFID chip; hence, allowing a veterinarian the immediate access to vital information in case of emergencies. Otherwise stated, the RFID system allows for the most important information to be stored directly onto the microchip, such that it can be read instantly without the need for any other referenced information. Such action may be useful in locations where either internet access or phone reception access is limited. Generally, a handheld device may be used to read and write the information to the microchip in a field or office setting. As previously mentioned, such design may be useful when the animal is in a remote location such that retrieving information from an internet connected database is not possible.

The optional embodiments of the present invention include read/write RFID technology which may be used in horses or other members of the Equidae family wherein the subcutaneous RFID device may optionally be injected into the ligament nuchea or nuchal of a horse. In further optional embodiments, other industry approved tissue may be utilized for the injection site of the RFID device.

After injection, an RFID reader in combination with or without a computer operating system may be used to interrogate the subcutaneous RFID microchip and access the implanted device. Generally, each RFID microchip includes a unique identification number, a number used only for that microchip with the chip having limited space for subsequent information to be written to or retrieved from the device.

In optional embodiments of the invention, the read range and frequency of the RFID device to be implanted may optionally be intentionally low as to preclude or at least lessen interference from other devices. This may also assist in precluding or lessening unauthorized interrogation of the chip.

In optional embodiments, the RFID device may operate on a 134.2 kHz frequency (ISO, 11784/85) but optionally may include any other frequency within the scope of any approved international standards, organization, classification or any U.S. approved frequency device. Generally, ISO 11784/85 is understood to be an international standard that may regulate the radio frequency identification for the use of animals for RFID devices planted beneath an animal's skin. ISO 11784 specifies the general structure of identification code whereas ISO 11785 may specify how a transponder may be activated and how the stored information may be transferred to a transceiver.

In further optional embodiments, ISO 14223/1 may be utilized for advanced transponders for animals. Generally this international standard is based upon the 11784/85 standard and additionally describes the air interface between the transceiver and advanced transponder. This standard may additionally assist in authentication in reading of the data integrated within the RFID device.

The previously mentioned frequency, 134.2 kHz, may be understood to be the carrier frequency for animal identification. Generally, there are two understood protocols in use to communicate between tag and reader consisting of either full duplex or half duplex. The frequency of 134.2 kHz is utilized with a half duplex system where 112 bits may be available though the majority of bits may be reserved for specific applications. Obviously, in other optional embodiments a variety of different styles of frequencies chip designs as well as standards may be utilized with the present invention. In further development of RFID chips, additional information including bio-sensors may be available on the chip and in no way is the invention of the above captioned application limited to RFID chips having been already produced or created.

In one optional embodiment for the specific read/write storage chip, it may provide the capability of 2048 bit (approximately 2 kb) of read/write storage. This allows for significant information to be placed on the RFID chip, and can include various information including, but not limited to owner information, animal life information such as age, breed and sex, as well as health information including vaccinations, medications, surgeries, or diseases. Veterinary information may also be included.

One noted advantage of the present invention is that not only is the use of the RFID chip a relatively quick and efficient way to store and retrieve information, but since it is stored on the chip implanted within the animal, questions concerning its authenticity are lessened. Furthermore, by storing the information on the animal directly, cases of fraud and counterfeiting may also be lessened. As RFID chips are limited as to their storage capacity, in optional embodiments, there may be a source for less important information stored on an internet accessible database that can be accessed by using a unique ID code assigned to the animal.

An optional RFID chip device that may be used in optional embodiments may include a HITAG S2048 Transponder IC. Optional software and hardware that may be used with such chip device may include a Windows® Mobile based PDA with an ACG LF MultiTag R/W Module. The ACG Read/Write Module may allow the PDA to communicate with the RFID chip device to store and retrieve information. The module can connect to the Compact Flash port of the PDA to communicate with software. Generally, the software may allow a user to read information from the chip and can also provide a simple form interface for filling in any required information. The software may also optionally help to divide the storage space on the RFID chip into "pages" to reflect the different areas of information that may be adapted to the RFID chip.

In optional embodiments that utilize the HITAG S2048 Transponder IC, such RFID chip has a total capacity of 2048 bits divided into 16 pages of 4 blocks which use 4 bytes pre block for the present invention. These blocks may be addressed 00$h$-3Fh as illustrated in FIG. 4. Block 00$h$ may be a read only block that can hold the device serial number whereas block 01$h$ may be used for configuration of the device. The remaining blocks, 02$h$-3Fh may be used for data input relative to the system for the animal. Otherwise stated, FIG. 4 provides a general overview of how the RFID Tag Memory could be arranged on the RFID chip. FIG. 5, provides a more detailed breakdown of the general memory storage. For example, the United States Equestrian Federation Registration Number could be included in Block 7, whereas the breed/discipline and other useful date could be included in Block 8. Obviously, variations of such design are contemplated with this invention and the arrangement of data on the chip could be in a variety of different arrangements. Furthermore, as technology advances, one envisions even greater memory being available on implantable RFID chips will allow for even greater storage of information that may be pertinent to the end user.

According to another optional aspect of the invention, a system may include animal record RFID software which may reside on a PDA or the like including a PDA enabled cell phone or smart phone or other portable or stationary computer containing an appropriate RFID reader. Additionally, Bluetooth® or other near-field technology may be utilized with the invention of the above-captioned application. Near-field and Bluetooth® technology may optionally apply to an RFID reader and may include items such as a handheld RFID reader, glove or wand with a Bluetooth® or other near-field technology sending to and receiving data from a nearby computer communication device.

In yet further optional embodiments, the reader may include a ACG R/W Module that has a range of about three to four inches, which is likely more than sufficient in reading chips once the chips have been implanted into the animal. In further optional embodiments, other devices can be used that provide for either a larger read range, or alternatively do not use Compact Flash as newer devices often do not include such capabilities. As mentioned previously a Bluetooth® read/write module could be used which may further allow for widespread acceptance.

In optional arrangements, an RFID device may be injected by an individual which may include a veterinarian or other medical professional for animals and once injected the veterinarian may activate the RFID device which is subsequently identified and accessed by the reader/software application. As used herein, "activate" may be interchangeably used with interrogate when referring to RFID devices. Once the individual is able to access the RFID device, the veterinarian may digitally write both essential and non-essential animal record information directly to the device. The information may then be locked and a digital signature may be written to the device to indicate the last authorized individual who had added to or altered information residing on the RFID device implanted within the animal. This may advantageously provide a way of maintaining information with the animal which may be considered to be more secure as most individuals may be precluded from having access to the chip or alternatively specific individuals may only have access to the chip implanted within the animal. Otherwise stated fewer individuals will be able to rewrite or write data onto the chip though a wide number of individuals may optionally have the capacity to read information contained on the implanted RFID device within the animal.

A further optional method of data transfer may involve a user (owner, trainer, veterinarian or other qualified person) request for (write capability) within the software. As each microchip can be encrypted with interrogation and informational access codes, owners may request updated informational changes to an individual animals RFID device so as to generate date essential and nonessential records. In further embodiments, a SAS 70 compliant data center could verify the authenticity of this request and send an updated electronic format with the revised information. Once accessed, the owner or other qualified personnel could download the encrypted format with data updates to our record management software. Upon interrogation of the microchip, the software could detect and decipher the unique encryption code of each respective RFID device and match it to the encryption code on the updated format. The encrypted format on the software can act as a unique electronic key to help ensure that the data to be written to the device is intended for that particular animal. If the encryption codes do not match, write or update access to the RFID device would not be permitted. If access to the device is not granted, the qualified individual can contact the administrator of the service via secure electronic communication for resolution.

The RFID communication device which as previously mentioned may include a PDA or cell phone or smart phone may be utilized to access a database wherein a veterinary individual may upload the data residing on the RFID device to a data bank with the information associated to the individual file for the animal. In additional optional embodiments the database may be proprietary or independent to which the veterinarian provides and uploads the information thereto. Additionally, veterinarians may also access their own veterinarian practice management system (VPM or VPMS) and also upload information to their practice database system which may include procedurals notes, steps taken, or other information about the animal deemed to be necessary in a management and care for the animal having the implanted RFID device.

Optional embodiments of the software interface may be generally represented by FIG. 1. With this optional embodiment, the software may include several interface screens to view and edit different information. This may include a "Main Page" with buttons to access different areas of information that may be stored to the chip. The "Owner Info" tab may provide information about the owner of the animal whereas "Member Info" may provide information about the association membership information for the animal. "Init Info" may provide initialization information regarding the connection with the Module whereas "R/W" may permit the user to read or write data on the RFID chip. Obliviously, this feature, among others, can be selectively tailored depending on the clientele. The "Read All" button may allow the user to read all the data from the RFID chip and then display the data in the text box.

In further optional embodiments, of the present invention the read/write RFID microchip may be associated with software residing on a database which may be accessible by Internet connectivity. Generally an Internet enabled portable computer may include an integrated RFID reader or optionally a removable RFID reader or wireless communicating technology such as blue-tooth where the veterinarian or other authorized person may access the central database and once authorized may be directed to web based software so as to allow the implanted RFID chip to be opened and the information accessed. Optionally, alterations to the data maintained on the chip may be performed using web based software associated with the system for the present invention. Data changes may be recorded during their procedure and may be digitally locked on the RFID device implanted within the animal.

In some optional embodiments the communication device may not have proper access to the database or server and thus the veterinarian individual may optionally store data obtained from the chip and subsequently upload the data to the necessary central database repository upon either receiving a signal or returning to their home computer which likely has internet capabilities. Depending on the optional embodiments, the system may include a host system 10 with a web-based network structure residing on one or more host servers 26 which is effective to receive and transmit data over a communications network 28 with one or more computers on remote servers associated with various separate veterinarian entities or users of the remote devices represented by numeral 30.

The term "web-based system" as used herein may, unless otherwise stated, refer generally to a platform effective to implement web-transitory functions, whether browser-based or otherwise. In other embodiments, the host system may include other computer-based platforms such as for example peer-to-peer structures which may not be explicitly web-based.

The term "communications network" as used herein with respect to data communication between two or more parties or otherwise between communications network interfaces associated with two or more parties may therefore refer to any one of, or a combination of any two or more of, telecommunications networks (whether wired, wireless, cellular or the like), a global network such as the Internet, local networks, network links, Internet Service Providers (ISP's), and intermediate communication interfaces.

A host system 10 in accordance with the present invention may include one or more data processors 12, a graphical user interface 14, and a computer-readable memory medium 16 containing a computer program 18 executable by one or more data processors 12 using techniques as are well known in the art. In some embodiments (not shown), a single memory medium 16 may be provided which is effective to store the computer program 18 and also any data which is received and used in relation to the program 18. In other embodiments a plurality of memory media 16 including that containing the computer program 18 as well as one or more databases 20 or equivalent storage entities 20 may be provided and functionally linked to collectively perform the functions of the system 10 as described herein.

In various embodiments of the present invention, a database 20 is provided and effective to store animal-related information 22 associated with a plurality of conditions, diseases, reports, or the like for which a user may review in reference to an animal, and further to store a plurality of templates 24 associated with sheets, pages, boxes and the like which may be intended to be generated for display via the user interface and populated with data provided thereby based upon the specific animal, most often being an equine.

In some optional embodiments, the computer program 18 may contain various instructions executable from a single program to perform functions as described below. The program instructions may further include or otherwise define a plurality of software modules executable by the data processor 12 to perform the functions as described below. In various embodiments the system 10 may include a plurality of servers upon which separate components reside but are electronically coupled, or upon which identical copies of the various components reside for more rapid and efficient use of resources.

The term "computer-readable memory medium" as used herein may refer to any medium alone or as one of a plurality of memory media having processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to central processors, parent processors, graphical processors, media processors, and the like.

The term "user interface" as used herein may include a host website with one or more web pages and various associated graphical or audiovisual elements such as for example icons, buttons, check boxes, text boxes, sounds, videos and the like. This may optionally be the interface that users see associated on various handheld devices while using such device with an animal having an implanted RFID chip.

Thus in some situations where a veterinarian may be able to complete the procedure of uploading and maintaining information on the device while in the field so long as the Internet connection is viable. Furthermore optional embodiments may include a hand held PDA or other portable computer device having the RFID writer integrated thereto or removable therefrom so that the information may be quickly and readily available for upload to the Internet in use with the software of the present invention. Advantageously, data may be quickly maintained and enabled onto the software so as to avoid possible delays and/or issues of device failure.

Figure 6:
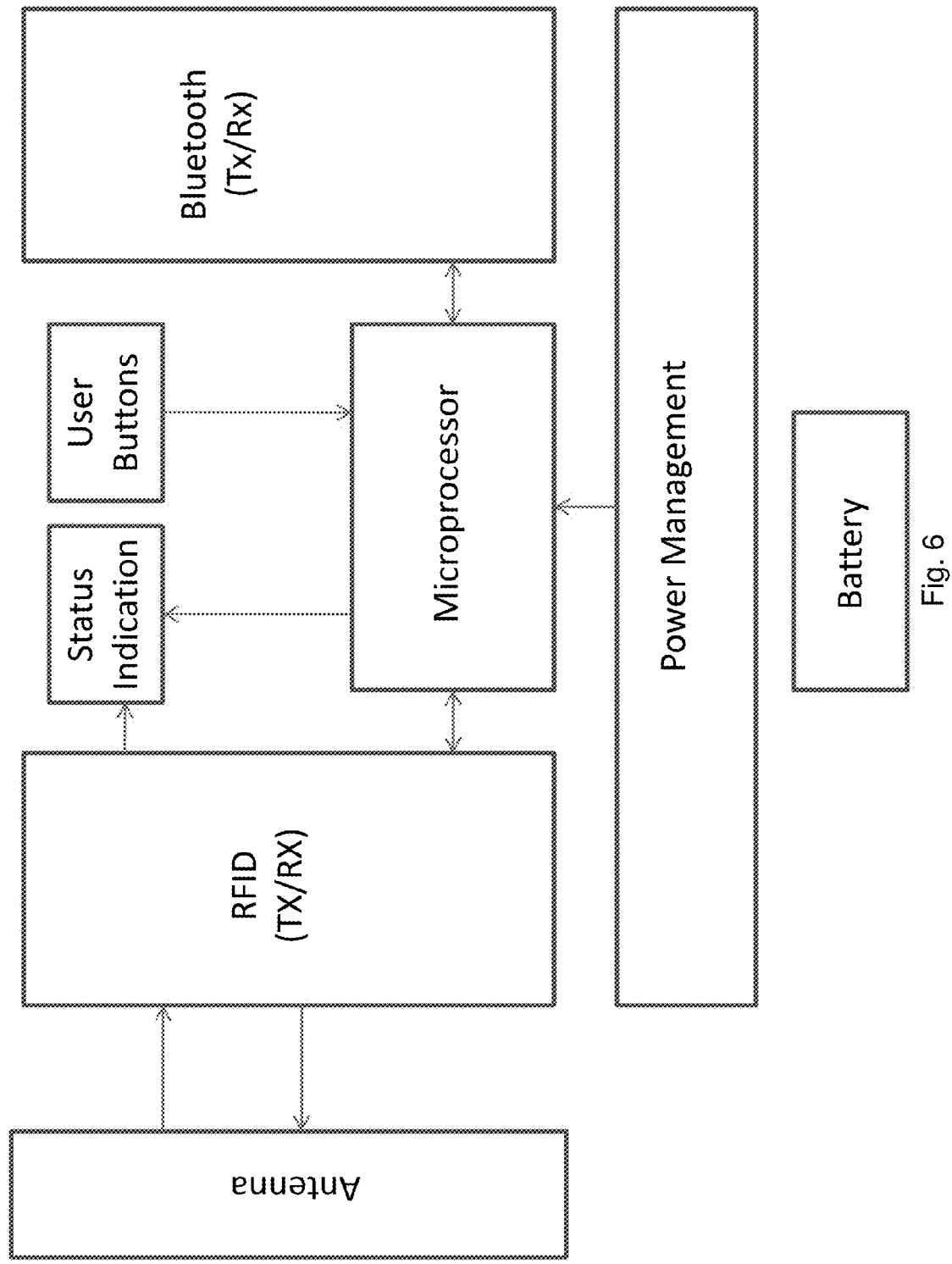
FIG. 6 is a block diagram of an optional embodiment of the bridge controller.

In further optional embodiments of the invention a RFID bridge controller may be utilized to provide for greater usability of the device. FIG. 6 provides a general block diagram of an optional embodiment of the bridge controller. Generally, the RFID bridge controller may be understood to be a small, electronic, handheld device that may be controlled by a user. Rather than maintain all functionality through a web-based system, or alternatively at a remote location, the use of the RFID bridge controller provides for immediate user control without having to rely on further network access.

Generally speaking, the RFID bridge controller is utilized to directly access the RFID device within the animal. As such, the RFID bridge controller can be designed and implemented with a variety of different controls and features. One such feature of an optional RFID bridge controller is the use of a battery control feature and user feedback interface.

Generally speaking, the use of such battery control feature and user interface allows the user to understand the status of the battery and how much remaining power is available for the use of the device. One reason for the importance of the power management of the RFID bridge controller is that the RFID tags that are generally implantable within animals are passive RFID devices. Passive RFID devices do not contain a battery and thus power is supplied by the reader, or in these optional embodiments, by the RFID bridge controller. Generally speaking, when the RFID bridge controller comes into a close proximity to the RFID tag, the user can activate the RFID bridge controller which will use radio-frequency fields to activate the RFID device. Being passive, this style of RFID tag requires more energy than RFID devices that are either active or battery assisted devices. However, advantageously, passive RFID devices are generally less expensive and smaller, providing reasons for their use. Furthermore, with the RFID devices being implanted within animals, it is advantageous not to have a battery as passive RFID devices generally have a lot longer life-span and thus there will not have to further implantations done to the animal in most instances. Regardless, with the increased power draw due to the passive RFID devices that will likely be used in many optional embodiments of the present invention, a user must be aware of the power consumption of the RFID bridge controller and respond accordingly.

In optional embodiments of the RFID bridge controller, the RFID bridge controller may include a module or circuit that may monitor and value the total time an RFID device has spent in an activated, or powered state. In doing so, the RFID bridge controller may be able to better approximate the power consumption by toe implanted RFID device and thus better estimate the power remaining for the specific battery. In doing so, the RFID bridge controller may be able to make an approximation of how many more uses the controller would be able to perform before the battery becomes too diminished for the device to function. Generally, this may be in a numeric value, and could indicate for how many additional animals the RFID bridge controller would function prior to shutting down for too little of power.

Furthermore, the RFID bridge controller can also include a module so as to determine the total time the RFID bridge controller is on, but not powering a passive RFID device. In doing so, the device could better approximate the amount of energy consumed between the device being in a non-active state and an active state so the device is capable of providing a more accurate assessment of the battery life.

In understanding the hardware associated with such optional embodiments of the RFID bridge controller, such may include at least one battery, monitoring circuitry and an output display for the user. The type of battery that may be included with such device, may widely vary and can include rechargeable and non-rechargeable batteries. Generally, the use of battery power is quite preferential for the RFID bridge controller in the first place, as often a user of the RFID bridge controller would have to be in close contact to large animals and may not be in a convenient location to access an electrical outlet. As such a variety of standard and off-the-shelf batteries may be used to power the RFID bridge controller ranging from standard AA batteries to CR123 and any other batteries that may be commercially available and have enough power to run the RFID bridge controller.

The output display may provide for information/data related to the battery life to a user interface in a variety of different manners. In some optional embodiments, the interface may indicate a low battery alert whereby a user is alerted when the battery power is below a specific level. For example, this may include a visual alert when the battery power drops below 10% or alternatively could provide an alert when less than five uses remain.

In further optional embodiments, the battery power feature may include a constant battery alert whereby a user would at about all times be informed of the battery status of the device. In such arrangement, a series of bars, or some sort of meter could display the available power, or alternatively a percentage level could be used. Otherwise stated, visually on the device, a representation of the remaining battery life could be displayed in either a bar format, or alternatively as a numeric value.

Referring again to FIG. 6, the Antenna may be a specialized antenna that may be tuned to a specific resonance. The RFID box, the RFID communication module may be used to handle the radio frequencies required by the system for communications. Optionally, this may be designed to provide for enhanced security. The RFID module is controlled by the microprocessor. The microprocessor is understood as the portion of the device that may control functionality and provide auto-detection of the RFID implanted device. The Bluetooth module may communicate with a personal computer or mobile-type device to provide feedback on the progress and information. The status indication provides feedback to the user and may be physically performed in a variety of different manners whereas the buttons allow for the interaction of the user with the device.

In an additional optional embodiment of the present invention an identification code optionally known as a premise ID and or interstate movement permit along with Certified Veterinary Inspection (Health Paper) document may be associated with an individual animal, owner and/or manager or premise location where the ID may be issued by a state regulatory agency, federal regulatory agency or breed or event discipline association or authorized veterinary inspector relating the animal to a registered database. So as to provide the user benefits while having a premise ID, the invention of the above-captioned application advantageously may optionally include a premise ID permit or card having an embedded RFID or other near field communication device with its own unique identification number. Thus, a read write or read only RFID enabled ID card may be utilized for the system wherein to access stored information on the subcutaneous RFID device, the RFID enabled premise or other issued identification permit may be first interrogated and its unique identification number captured. The subcutaneous RFID device may then be interrogated and accessed wherein the unique identification number on the permit or card may act as a digital key to access information residing on the implanted RFID device. This may optionally allow change or alteration of information contained on the device. In optional embodiments of the present invention, this method may apply to alteration procedures and thus allow attending personnel or authorized personnel to access pertinent medical and/or registration information in the event of an emergency. Such embodiments of the present invention may be utilized with the aforementioned systems where internet connectivity may or may not be available for the authorized user or veterinary or medical personnel.

Generally, the invention as above-described pertains to the storing and receiving of essential and non-essential, government regulatory, breed and event discipline sanctioned organizations, medical and management history on a readable/writable RFID device for an animal including horses as well as other companion animals and furthermore, even game animals. The information contained on the RFID device can be similarly contained on a database and optionally with a complete or more comprehensive history of the animal which may be accessible through an internet connection. In optional embodiments, data on the RFID device may be locked by encryption technology and may be updated, erased and rewritten. With current RFID technology allowing for over 100,000 erases and rewrite cycles, a chip would likely not have to be replaced within an animal.

In further optional embodiments information encrypted on the read/write chip may include the animal's pertinent information which may be understood to be the animal's life information. For horses such information could include but is not limited to the following categories:

(1) Identification—the animal's unique identification number which in the United States is referred to as AIN or other numerical code recognized by any local, state or federal governing agency or body. This number is understood to be unique to each animal and generally no chip will duplicate the numbering encrypted on the device. The RFID device depending upon the operating frequency of the device generally includes at least about 12 to 15 digits but may change as technology and regulations require.

(2) Animal Birth Name—This generally considered to be the name registered with any breed event or government regulatory body at the time of birth of the animal and can be permanently locked onto the device.

(3) Breed—This information may refer to any U.S. or internationally recognized breed and/or breed association which for example can include Arabian, Percheron, or Thoroughbred or any newly formed cross bred breeds.

(4) Breed Registration Number—Generally this number is understood to be the unique registration number assigned to the animal by a particular breed discipline or event/competition association.

(5) Color—Such information may be included to describe markings both natural and artificial on the animal as well as brands, tattoos, conformational variations or other indicating features.

(6) Date of Birth—when the animal was born.

(7) Sex—Generally this would, for horses, distinguish between male, female or gelding.

(8) Genealogy—In optional embodiments this may be included to indicate the parents or other related horses to the implanted animal.

Updateable data that may reside on the microchip and may be subject to change or alteration or deletion or new entry may include for example but is not limited to the following categories:

(1) Premise Identification Number—This number may be considered a unique number given by a government (federal, state or local) agency signifying the location of a particular farm, estate or other breeding, foaling or boarding facilities where in the animal generally resides.

(2) Premise Name—This may include the name of a particular farm/stables or training facility where the animal may reside.

(3) Owner Name—This may include personal and contact information such as the address, telephone number, e-mail address and any other information that may be utilized to contact the owner.
(4) Particular Breed or Discipline Registration Passport Data—This information may encompass any breed discipline or event competition identification data such as discussed previously.
(5) Certified Veterinarian Inspection Data (CVI) or Digitally Generated Certificate Veterinary Health Papers— This health information is often required in many states and currently includes test results for Equine Infectious Enema in the form of a "Coggins Test." Future infectious disease concerns may also prompt state, federal or local governments or even breed and event sanctioning bodies to require tests for other infectious diseases in order to transport, board, breed or compete/show the animal in a particular state, country or sanctioned event.
(6) CVI Inspection Dates, Lab Name and/or Lab I.D. Number—This information may allow state and/or federal inspection personnel to trace the identity of CVI inspection tests in the event of an infection disease outbreak or fraudulent test result.
(7) Vaccinations—This information may provide a list of past and present medications signifying dates, dosages and the manner in which the medication or compound may be administered to the animal.
(8) Medications—This information may include a list of supplements, prescription, and general over the counter compounds which may have been prescribed by veterinary or available for common purchase.
(9) Medical History—This may include conditions, diagnostics, treatment and therapy information pertaining to the specific animal which can include a report of past injuries, sicknesses or occurrence of diseases.
(10) Dietary Needs and Nutritional Requirements.
(11) Breeding History—This information may include dates when the animal is last breed and further information including ovulation cycles or breeding methodology and the number of breeding attempts.
(12) Genetic Test Results—This information is commonly used in breeding practices to determine the probability of deformations or probable traits of offspring using genetic code information of the animal's parents.
(13) Farrier History.
(14) Primary Veterinarian Information—This information may include the veterinarian name, the practice name, address and contact information.
(15) Training and Management Regiment—This may include details about the horse's general training as well as how the horse has been managed so that individuals are aware of the work capacity of the horse.
(16) Event/Competition History—This may include competition placement of animal or owner, trainer suspensions as well as infractions and penalties. Generally this information may assist regulatory agents both public and private in monitoring and regulating abuses of the animal or violations of public law or private association rules, practices or procedures.
(17) Suspensions or disciplinary actions—This may include instances where an owner or trainer receives a disciplinary action or is suspended for an amount of time from events and also when such suspension or disciplinary action may cease.
(18) Dental Records—Such information may relate to the dental condition of the animal and/or track dental procedures.
(19) Insurance Information—This may include information related to the valuations, coverage and carriers.
(20) Genealogy—This may include information about the family, linage, and history of the animal.

As previously mentioned in reference to FIG. 4, different types of data can be stored on the RFID chip. Some of the data may be plain text and in other embodiments, some information may be in the form of predefined numeric representations of other data. The items that may be enumerated in this manner so that they can easily be represented by a number valued may include for example the nineteen different breeds for equine. Each breed could be assigned a number from 1-19 as illustrated in the below list:

1. "Andalusian/Lusitano"
2. "Arabian/half-Arabian/Anglo-Arabian/National Show horse"
3. "Connemara"
4. "Dressage"
5. "Driving"
6. "Endurance"
7. "English Pleasure"
8. "Enveting"
9. "Friesian"
10. "Hunter"
11. "Jumper"
12. "Morgan"
13. "ParaEquestrian"
14. "Paso Fino"
15. "Reining"
16. "Saddlebred/Hackney/Roadster/Shetland/Parade"
17. "Vaulting"
18. "Welsh"
19. "Western With the software, the breeds, for example, could be represented by a number and instead of requiring several bytes of data to state the breed type, only 2 bytes of storage space would have to be reserved.

As horses may be a considerable financial investment and do constitute a unique economic segment of the national and world economy, such information could prove very beneficial from both an economic standpoint as well as a practical point in informing and insuring certain individual information is maintained with the horse. Generally the U.S. equine industry includes somewhere around 9.2 million U.S. horses which generates over $100 billion dollars. While classified as livestock, such horses are unique in many respects from other livestock species as they are consumed by humans as in other countries and their owners expend more than $2.3 billion dollars annually on veterinarian care as the horse industry itself creates almost 500,000 full time jobs.

The invention of the above-captioned application is advantageous as it provides a safe, accurate, immediate and secure retrieval of critical information which can benefit horse owner/managers and trainers, veterinarians, local, state and federal regulatory agencies, breed event/discipline associations, as well as investors and buyers or other individuals with significant financial interest in the equine industry.

In further optional embodiments of the invention the system may be utilized for companion animals straying from home where additional information could be extremely useful as a veterinarian would be able to have access to vital medical history information that was placed upon the chip.

While the instances of a horse or equid wondering away are less likely than companion animals, this too would assist in such circumstances as accurate medical records are not easily accessible in the event of an equine emergency. With over hundreds of thousands of horses traveling across state and international lines each year in the United States, many of these animals undertake the serious risk of injury at competitions whereby medical information could assist in saving the horse's life. Additionally, foreign environments along with improper administration of medications or compounds may also contribute to death, illness or disease. And in cases such as this, it is unlikely that one's personal veterinarian would also be traveling with the animal. For reasons such as these, the invention of the above-captioned application is advantageous so that critical medical history would be readable in an electronic format that could be immediately accessible in a read/write microchip.

In a further optional aspect of the invention federal, state and local governments may benefit as most state governments require health certificates to transport horses into state jurisdictions. These certificates which are sometimes referred to as health certificates or certified veterinary inspection documents are generally utilized to verify that the animal has been tested for certain infection diseases by a qualified testing facility and found to be clear of one or more infectious disease. As such tests are generally administered for the disease equine infectious anemia but may include diseases such as but not limited to west Nile virus, equine encephalitis, strangles, foot and mouth disease, pyroplasmosis or any other known infectious agent which may enter the nation's equine livestock.

Generally such verifications are presented in the form of a health certificate which can be easily forged and have been in the past. A system such as what is provided in the above-captioned application with digitally encrypted data on an injectable microchip having lock features will likely alleviate the risk of infectious outbreak by ensuring accurate reports while expediting the processes for veterinarians and government inspection agents. Additionally the system may also assist owners by limiting the need to carry paperwork for each animal as the animal is transported across state lines. Furthermore, such system as described herein may also provide a second layer of CVI authentication in the form of on-line CVI reports that could additionally benefit the industry as a whole.

Furthermore, as there are more than 500 breed, discipline and equine enthusiast organizations with many organizations requiring thorough identification documents indicating proper registration of the animal with the particular organization, the system of the present application may prove to be extremely useful. As such, a single microchip within the injected RFID device may include the information usually stored which may eliminate the need for such documents to be on hand when horses are used for competing or showing in a particular association or discipline.

In yet further embodiments, the injected RFID device can be implanted into the neck region of variety of animals. In optional embodiments, this may include game animals on preserves or the like. An example may include but is not limited to game hogs. Further optional types of animals for which the injected RFID device may be utilized may include animals such as sheep. Additional optional embodiments may include a variety of food and non-food animals.

Furthermore, sizes of various structural parts and materials used to make the above mentioned components are illustrative and exemplary only, and persons of ordinary skill in the art would recognize that these sizes and materials can be changed as necessary to produce different results or different desired characteristics.

It would become apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A web-based system comprising:
   a host database residing on a server coupled to a communications network;
   a user interface functionally linked to said server;
   a processor functionally linked to said server; and
   a computer-readable memory medium functionally linked to said server and said processor and having instructions residing thereon, said instructions executable by said processor to cause the system to
      populate the database with specific animal related information sorted into a variety of different groups,
      provide an input for providing information about an animal;
      generate a output from the stored data for the animal, each output being optionally protectable or deletable depending upon a user's granted access; and
      provide visual output based upon the user's selected request for information and the animal which is being monitored.

2. The web-based system of claim 1 wherein the specific animal related information that populates the database comprises livestock related information which includes equine related information.

3. The web-based system of claim 2 wherein the livestock related information comprises horse related information.

4. The web-based system of claim 1 wherein the animal comprises a livestock animal.

5. The web-based system of claim 4 wherein the livestock animal comprises a horse.

* * * * *